Figure 1:
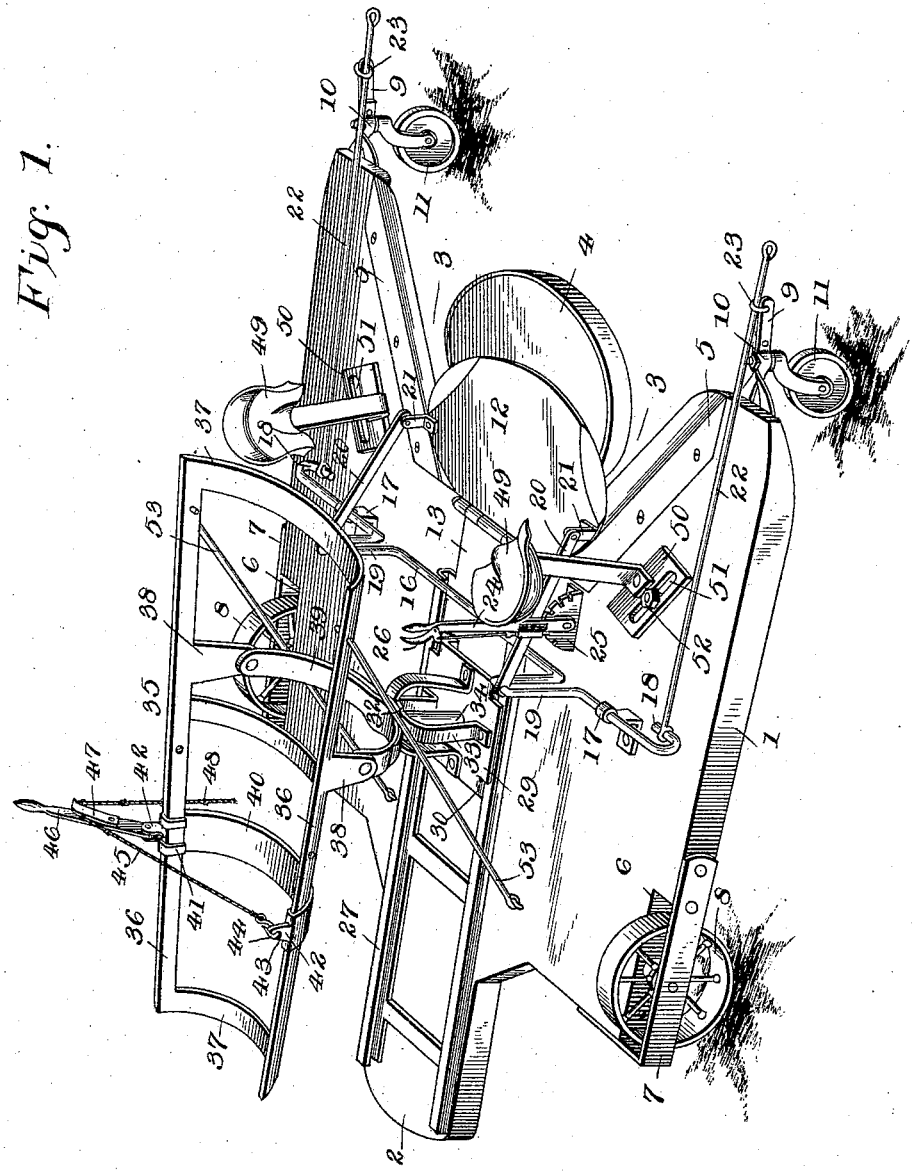

(No Model.)  3 Sheets—Sheet 1.
E. T. DEATH.
CORN HARVESTER.

No. 575,504. Patented Jan. 19, 1897.

Witnesses
Chas. A. Ford.
V. B. Hillyard.

Inventor
E. T. Death,
By his Attorneys.
C. A. Snow & Co.

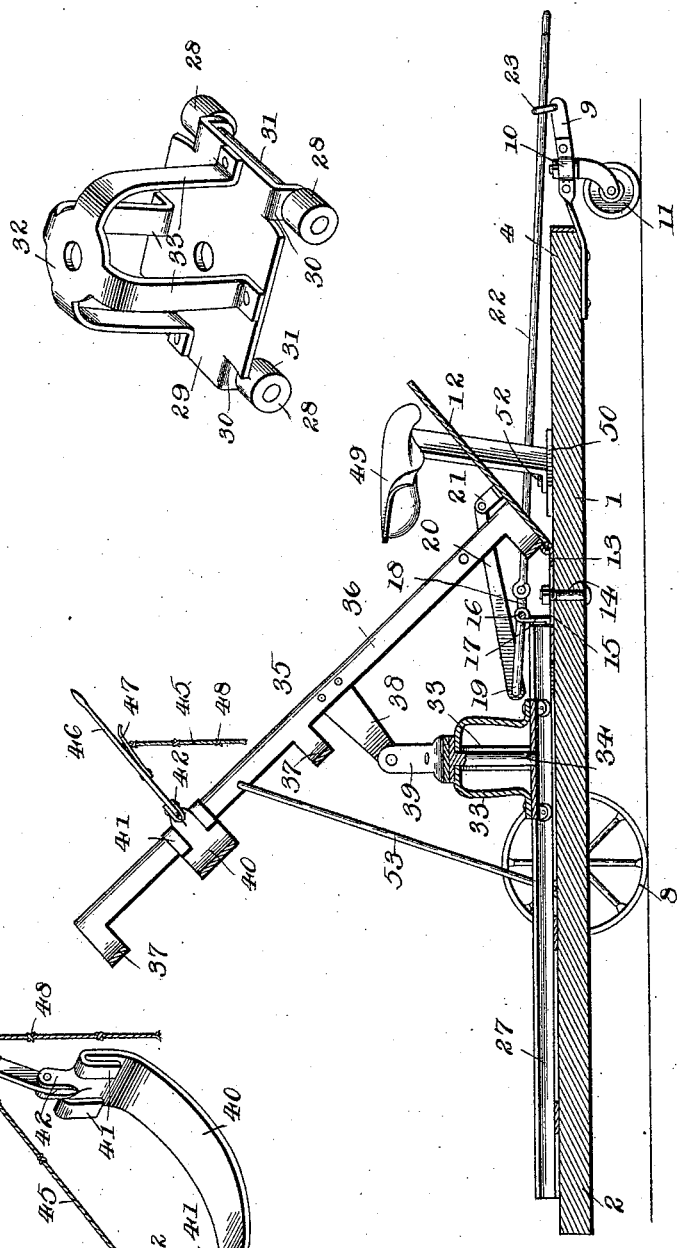

(No Model.)
3 Sheets—Sheet 3.
E. T. DEATH.
CORN HARVESTER.
No. 575,504. Patented Jan. 19, 1897.
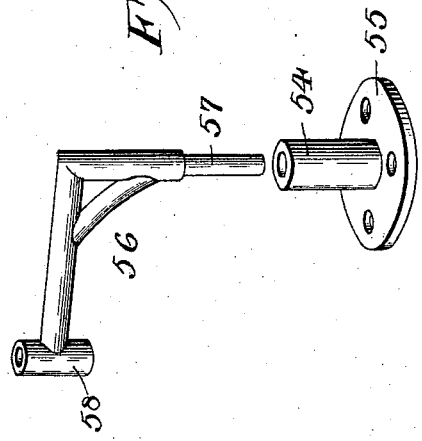
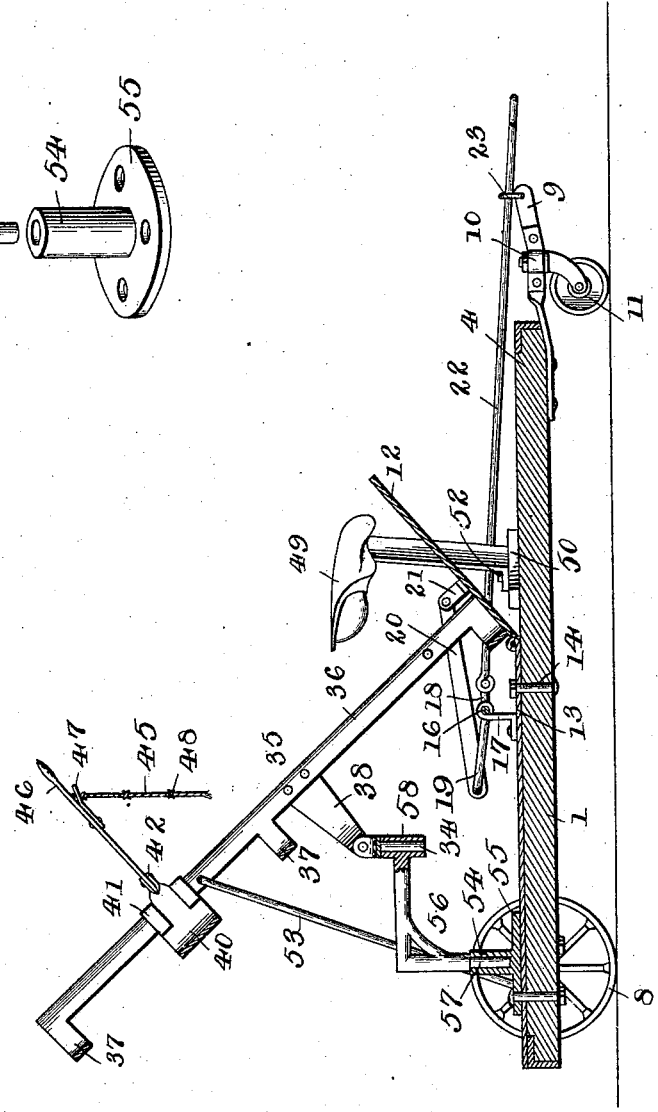
Witnesses
Chas. A. Ford.
V. B. Hillyard.
Inventor
E. T. Death,
By his Attorneys,
C. A. Snow & Co.
THE NORRIS PETERS CO., PHOTO-LITHO., WASHINGTON, D. C.

UNITED STATES PATENT OFFICE.

ELMER T. DEATH, OF GREENVILLE, OHIO.

CORN-HARVESTER.

SPECIFICATION forming part of Letters Patent No. 575,504, dated January 19, 1897.

Application filed July 31, 1895. Serial No. 557,753. (No model.)

*To all whom it may concern:*

Be it known that I, ELMER T. DEATH, a citizen of the United States, residing at Greenville, in the county of Darke and State of Ohio, have invented a new and useful Corn-Harvester, of which the following is a specification.

This invention relates to corn-harvesters which embody in their organization means for forming a shock, and aims to improve the general construction of this class of agricultural implements, whereby their usefulness is increased, the cost of manufacture reduced so as to place the machines within reach of the average farmer, and whereby the fodder or grain can be cut and formed into shocks by the driver and an assistant in an expeditious and satisfactory manner.

Other objects and advantages will become apparent as the nature of the invention is understood from the following description and the accompanying drawings, in which—

Figure 1 is a perspective view of a corn-harvester constructed in accordance with and embodying the present invention. Fig. 2 is a longitudinal section showing the manner of squaring the butt-end of the shock. Fig. 3 is a detail view of the carriage upon which the shock-former is mounted. Fig. 4 is a detail view of the means for temporarily binding the shock while applying the band or permanent binder. Fig. 5 is a longitudinal section showing a modified form of carrier for the shock-former. Fig. 6 is a detail view of the parts comprising the modified form of carrier, showing them separated and disassociated from the machine.

Similar numerals of reference indicate corresponding parts in the several views.

The platform 1 has a rear extension 2, and converging slots 3 extending inwardly from its front end, and which form passages for the entrance of the grain or stalks as the machine is drawn over the field. The portion 4, intermediate of the converging slots 3, is rounded at its corners, thereby enlarging the receiving ends of the converging slots or passages 3, so as to facilitate the entrance of the grain into the said passages. Knives 5 extend along the outer edges of the slots or passages 3, and their cutting edges extend inwardly a sufficient distance to sever the grain or stalks in the effective working of the machine. The rear corners of the platform are cut away, as shown at 6, and angle-irons 7 close these cut-away portions on two sides, and the rear wheels 8 are located in the spaces 6 and are mounted upon spindles which are supported by the platform and the angle-irons 7. Draft-bars 9 are made fast at their inner ends to the front portion of the platform exterior to the passages 3, and are formed with vertical sockets 10, which receive the stems of caster or pilot wheels 11.

A butter 12 is located opposite the central portion 4 and is hinged at its inner or rear edge to a plate 13, having adjustable connection with the platform 1, preferably by means of a bolt 14, operating through a slot 15 in the said plate 13 in the usual manner. By this means the butter is capable of adjustment upon the platform to adapt its position with respect to the shock-former to suit the length of the grain to be formed into a shock. The butter 12 is a metal plate of substantially oval shape, and its end portions extend over the inner ends of the slots or passages 3, and that part of the butter occurring immediately over the passages 3 is sharpened to a knife-edge and is adapted to act in conjunction with the knives 5, so as the more readily to sever the grain and stalks. A shaft 16 is located immediately in the rear of the butter 12 and the knives 5 and is journaled near its ends in bearing-brackets 17, and has crank portions 18 at its ends and cranks 19 intermediate of its ends and which are connected by links 20 with studs 21, attached to the opposite ends of the butter 12. The cranks 18 and 19 extend in diametrically opposite directions and are of different relative lengths, the crank portions 18 being the shorter and having the draft-rods 22 connected therewith, said draft-rods passing loosely through rings 23 at the front ends of the draft-bars 9, and which are adapted to have the team hitched thereto. The normal tendency of the draft is to turn the shaft 16 in its bearings, so as to elevate the butter 12 for squaring the butt-ends of the stalks or grain, thereby enabling the shock to sit squarely upon the ground.

A hand-lever 24 has positive connection between its ends with one of the links 20, and has pivotal connection at its lower end to a segment-standard 25, rising vertically from the platform 1, and the usual hand-latch 26, provided on the hand-lever 24, is adapted to engage with the teeth formed on the upper edge of the segment-standard 25, so as to hold the butter 12 in the required adjusted position. Obviously when the machine is in operation a release of the hand-latch 26 will admit of the draft turning the shaft 16, so as to raise the butter without requiring any manual effort on the part of the driver or attendant.

The connection between the lever 24 and the link 20, to which it is attached, is such as to admit of the butter being moved under the influence of either the draft or power applied to the lever when the latter is released. As shown, a pin applied to the said link operates in a slot of the lever, but any equivalent connection admitting of the working of the parts may be employed.

A track 27 extends longitudinally of the platform 1 and occurs immediately in the rear of the central portion 4 and over the rear extension 2, and the rails thereof are grooved on their inner sides, so as to receive the supporting-wheels 28 of the carriage 29, which latter is a metal plate having end portions 30 bent downwardly and apertured to receive the shafts or axles 31, which are provided at their outer ends with the supporting-wheels 28. An elevated plate 32 is attached by means of feet or uprights 33 to the base of the carriage and forms a part of the latter, and this plate, as also the base of the carriage, is vertically apertured for the reception of a spindle 34, pendent from the shock-former 35, and by means of which the latter is adapted to be turned to facilitate the discharging and depositing of the shock upon the ground.

The shock-former comprises longitudinal bars 36, which diverge in their length, and cross-bars 37, connecting the longitudinal bars 36, and which cross-bars 37 are curved downwardly between their ends to conform to the curvature of a completed shock. Ears 38 depend from the longitudinal bars 36 and have pivotal connection with the ends of a yoke 39, which is attached midway of its ends to the spindle 34. Thus it will be seen that the shock-former is adapted to tilt to and from a horizontal plane and is adapted to be turned upon a vertical axis.

The temporary binder consists of a curved plate 40, having end portions 41, bent so as to embrace the sides and top edge of the longitudinal bars 36, and centrally-disposed projections 42, occurring between the end portions 41, and one of these projections has an opening 43 to receive a hook 44 at the end of a cord or rope 45, and the other projection is cleft and receives the end of an operating-lever 46, which is pivoted between the cleft portions of the said projection. A plate 47 is firmly attached at one end to the side of the lever 46, and its opposite portion is curved outwardly and away from the lever, so as to admit of the cord or rope 45 being forced between the said plate 47 and the lever 46 in the operation of the invention. This plate 47 is sufficiently elastic to bind upon the cord or rope 45 when the latter is forced into the space between the said plate and lever. To guard against any possible slipping, the said cord or rope is provided at intervals in its length with knots or enlargements 48, which operate in the manner readily understood.

Seats 49 are attached to standards, which have plates 50 at their lower ends and which plates are slotted, as shown at 51, to receive bolts or fastenings 52, by means of which the said seats are adjustably connected with the platform. These seats are located in proximate relation to the edges or sides of the platform and exterior to the inner ends of the knives 5, so that the attendants mounted upon the seats can readily gather the grain or stalks as the latter are cut and place the same within the shock-former, the latter during this operation being held in a nearly horizontal position by means of hooked rods 53, having their hooked ends detachably connected with the longitudinal bars 36 of the shock-former. During this operation the butter rests close upon the platform, so that its cutting portion will coöperate with the knives 5 and facilitate the cutting of the grain or stalks. After a sufficient quantity of grain or fodder has accumulated in the shock-former to make a shock the machine is brought to a standstill and the temporary binder is brought into service, so as to compress the shock and facilitate the application thereto of the permanent binder or band. Prior to the stopping of the machine the hand-latch 26 is released, so as to admit of the draft elevating the butter into a position for squaring the butt-end of the shock. After the shock has been temporarily bound to the shock-former the latter is released by disengaging the hooked rods therefrom and is tipped until the butt-ends of the stalks come squarely against the butter 12, whereby the butt-end of the shock is squared, after which the permanent binder is properly positioned and secured around the shock. The shock-former is now swung upon the spindle 34, so as to reverse its position and bring the butt-end of the shock, which was previously to the front, in the rear, thereby facilitating the dropping of the shock upon the ground, which latter operation is effected by moving the carriage along the track 27 to the rear end of the extension 2, after which the shock-former is turned into a nearly vertical position, when the shock will slide therefrom onto the ground. The temporary binder is released from the shock immediately after the application of the permanent binder and prior to the dropping the shock upon the ground. Inasmuch as the fodder varies in length and in order to adapt the temporary binder to the length of the fodder or grain to be formed into shocks, the temporary binder is capable of movement along the shock-former and is held in the required position by the friction between the bent end portions 41 and the longitudinal bars 36, as will be readily understood.

In the modification shown in Fig. 5 the carriage 29, the track 27, and the rear extension 2 are dispensed with, the plate 13 is made stationary, and the shock-former is supported by means of a carrier, so as to move forwardly and rearwardly to admit of the shocks being deposited upon the ground. This carrier comprises a tubular standard 54, having a base 55, by means of which it is firmly secured to the platform 1 in proximate relation to the rear end thereof. A crane 56 has a vertical spindle 57 at one end, which obtains a bearing in the tubular standard 54, and a vertical socket or bearing-sleeve 58 is provided at the outer end of the crane and receives the spindle 34 of the shock-former, thereby admitting of the shock-former being turned end for end when required. The crane 56 is of such a length so that when turned horizontally on its spindle 57 to bring the bearing-sleeve 58 to the front end of the machine the shock-former will be in position to receive the stalks as the latter are cut, and when swung so that the bearing-sleeve 58 is at the rear of the machine the shock-former can be tilted to deposit the shock upon the ground.

The machine will be built in various sizes and will assume different forms, according to the nature of the harvest and caprice of the designer. Therefore it is to be understood that in the embodiment of the invention various changes in the form, proportion, and the minor details of construction may be resorted to without departing from the principle or sacrificing any of the advantages of this invention.

Having thus described the invention, what is claimed as new is—

1. In a harvesting-machine, the combination with a shock-former, of a butter, locking means for securing the butter in working relation and draft-rods operatively connected with the said butter and adapted when the latter is released to raise the said butter into an operative position for squaring the butt-end of the shock, substantially as set forth for the purpose described.

2. In a harvesting-machine, the combination with a shock-former, of a butter, a shaft having crank portions, one of which has connection with the butter, and a draft-rod connected with the other crank portion, substantially as set forth for the purpose described.

3. In a harvesting-machine, the combination with a shock-former, of a butter, a shaft having crank portions, a link connecting one of the crank portions with the butter, a draft-rod having connection with the other crank portion, an operating-lever pivoted upon the base or platform and having connection with the said link, and a hand-latch carried by the said lever to engage with a notched segment to hold the butter in the required position against the draft, substantially as set forth for the purpose described.

4. In a harvesting-machine, the combination with the platform, and a shock-former, of a plate independent of and adjustably mounted upon the said platform, and a butter having a hinge connection with the said plate, substantially as set forth for the purpose described.

5. In a harvesting-machine, the combination with the shock-former, of a plate having adjustable connection with the platform, a butter hinged to the said plate, a shaft journaled in bearings upon the platform and having oppositely-disposed crank portions, links connecting one set of crank portions with the opposite ends of the butter, draft-rods having connection with the other crank portions, a notched segment, a lever pivoted to the notched segment and having connection with one of the said links, and a hand-latch upon the lever to engage with the teeth of the notched segment to hold the butter in the required position against the action of the draft, substantially as set forth.

6. In a harvesting-machine, the combination with the platform having cutting-knives and a shock-former, of a butter for evening the grain in the shock-former, movable with respect to the platform and shock-former, and having cutting portions adapted to coöperate with the said cutting-knives, substantially as set forth for the purpose described.

7. In a harvesting-machine, the combination with the platform having inwardly-converging passages, and cutting-knives arranged to project inwardly into the said passages and a shock-former, of a butter for evening the stalks in the shock-former located between the said passages and having cutting portions to extend thereover and coöperate with the aforesaid cutting-knives, and means for raising and lowering the butter, substantially as set forth for the purpose described.

8. In a harvesting-machine, the combination with a shock-former, of a plate having bent end portions embracing the longitudinal bars of the shock-former and having intermediate portions between the bent extremities, a rope or cord having connection with one of the intermediate portions, and a lever pivotally connected with the other intermediate portion and having a plate secured to its side for engagement therewith of the said cord or rope, substantially as specified.

9. In a harvester, the combination with the platform provided with cutting mechanism, and a shock-former, of a tubular standard secured to the platform, a crane having a vertical spindle journaled in the tubular standard and provided at the extremity of its horizontal arm with a bearing-sleeve, and a spindle mounted in the said bearing-sleeve and having pivotal connection with the shock-former, the parts coöperating in the manner set forth for the purpose specified.

In testimony that I claim the foregoing as my own I have hereto affixed my signature in the presence of two witnesses.

ELMER T. DEATH.

Witnesses:
JOHN WHITELEY,
GEORGE DININGER.